Feb. 22, 1938.  B. L. LORENZEN  2,109,048
JUICE EXTRACTOR
Filed May 24, 1937
Fig.1.
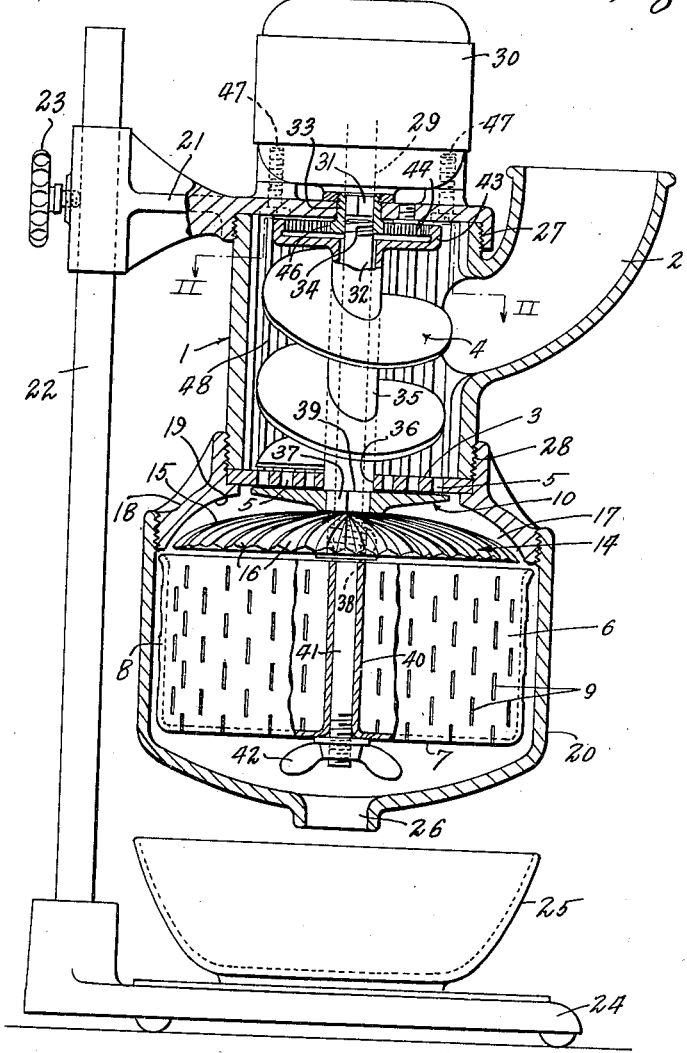
Fig.2.
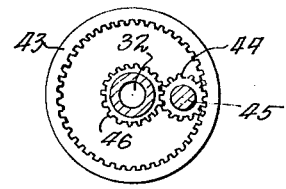
Fig.3.
Ben L. Lorenzen, Inventor
By Lyon & Lyon, Attorneys Patented Feb. 22, 1938

2,109,048

UNITED STATES PATENT OFFICE 2,109,048

JUICE EXTRACTOR

Ben L. Lorenzen, Los Angeles, Calif., assignor of one-half to Mary O. McComb, Los Angeles, Calif.

Application May 24, 1937, Serial No. 144,429

6 Claims. (Cl. 146—175)

This invention relates to a device for extracting juices from vegetables or fruits. The device is intended particularly for domestic use in kitchens or restaurants where such juices are to be extracted, but not on a great scale as in factories, or in canning establishments.

It is, of course, a fact that machines have been heretofore produced for reducing vegetables and fruit to the state of pulp, and for extracting the juices from the pulp by centrifugal means, but there seems to be at this time, no compact serviceable machine for performing these functions in kitchens and small restaurants where small quantities of the fruit or vegetables can be used from time to time to extract their juices.

One of the objects of the invention is to produce a machine of this character of very simple construction, which will operate effectively to reduce vegetables and fruit to a pulpy condition and extract the juices therefrom, and to construct the machine in such a way that although all of the working parts are aligned on the same shaft, the centrifugal extracting device or cage, can be driven at a high speed to enable it to function effectively, and the feed device and pulping mechanism of the machine will be driven at such a speed as to maintain a practical balance in the functioning of the machine; that is to say, the crushed pulp will not be delivered to the centrifugal cage at a more rapid rate than the cage can accommodate in performing its functions.

Further objects of the invention will appear hereinafter.

The invention consists in the novel parts and combination of parts to be described hereinafter, all of which contribute to produce an efficient juice extractor.

A preferred embodiment of the invention is described in the following specification, while the broad scope of the invention is pointed out in the appended claims.

In the drawing:

Fig. 1 is a side elevation and partial section illustrating the machine, certain parts being broken away.

Fig. 2 is a horizontal section taken about on the line II—II of Fig. 1, and particularly illustrating a type of reduction gearing which may be employed for driving the feed device and pulping mechanism of the machine.

Fig. 3 is a bottom plan of a rotary cutter, which preferably constitutes a part of the mechanism.

In practicing the invention, I prefer to construct the machine of a vertical type; that is to say, the operating parts are mounted to rotate around a vertical axis, and I prefer to have the driving shaft or motor for the machine located above the working parts. While the machine is preferably driven by a small motor mounted above the working parts, of course, if desired, the driving shaft can be rotated through the medium of a driving shaft which may be a flexible shaft, or otherwise. Although the machine may be attached to a wall, in the present specification I have illustrated it as a self-contained unit including a small platform to receive a bowl for catching the extracted juices, and including a standard or post extending up from the platform on which the casing and mechanism of the machine may be carried.

The machine preferably includes a casing having a body 1 of substantially cylindrical form, having a feed spout 2 through which the vegetables or fruit may be fed preferably in a more or less chopped condition. Within the body 1 of the casing I provide a feed device for feeding the fruit or vegetables downwardly, and for forcing the same through a perforated plate 3 mounted below the body. Any suitable feed device may be employed, but for this purpose I prefer to employ a helical feed screw or worm 4 having a relatively wide blade that projects outwardly, and operating to push the fruit or vegetables down against the plate 3 and through its perforations 5. These perforations may be of any desired dimensions. When the pulp of the fruit or vegetables has passed through the perforations 5, it descends into a centrifugal device for extracting the juices from the pulp. This device preferably consists of a cage 6 preferably having a solid bottom 7 and a substantially vertical side wall 8 having perforations, which may be in the form of holes or vertical slits 9, as shown.

In constructing the machine, in order to reduce the amount of power necessary for operating it, I prefer to have the perforations 5 as large as practicable, and to provide means for crushing the pulp to a relatively fine state after it is received from the perforated plate. In order to accomplish this, I prefer to provide a rotary cutting device 10 preferably consisting of a hub 11 mounted for rotation under the plate 3, and having a plurality of outwardly extending blades 12 with cutting edges 13 on their forward sides with respect to the direction of rotation. Below the rotary cutter 10 I prefer to provide a crushing burr 14 which is in the form of a disc preferably having a convex upper face 15, and provided with substantially radial V-shaped ribs or corrugations 16 adapted to crush the fruit.

Just above the burr 14 the casing is constructed so that a gradually narrowing throat 17 is formed along which the pulp passes on its way to the centrifugal cage. In practice, I prefer to construct this part of the casing as a separate ring 18 having a curved under face 19 that converges toward the convex face of the burr.

The machine is provided with means for driving the centrifugal cage at a relatively high speed, and for simultaneously driving the feed screw 4 and the pulping burr 14 at a relatively slow speed, in this way assuring that the crushed pulp will not be fed to the cage at a higher rate of speed than the cage can handle. In the practical operation of the machine, I rotate the cage at a relatively high speed which, for example, should preferably be at 3,000 R. P. M., or faster. Such a velocity will give a very effective centrifugal separation of the juices, and leave a very small quantity of pulp in the cage. After this pulp has accumulated to a considerable extent in the cage, it can be removed by removing a cup 20, which is detachably secured to the lower end of the ring 18, and then removing the cage to enable the pulp within it to be dumped.

The casing and working parts of the machine are preferably supported on a bracket 21 which, if desired, may be guided on and adjustably secured to a post 22 by means of a set screw 23, or other means. This post 22 extends up from the edge of a small base or platform 24 adapted to carry a bowl 25 to catch the juices that flow down through the delivery orifice 26 in the bottom of the cup 20. The upper end of the body 1 of the casing, may be attached to the under side of the bracket by means of screw threads 27, and the upper end of the ring 18 may be secured to the lower end of the body 1 by similar screw threads 28.

The mechanism of the machine is preferably driven through the medium of a vertical shaft 29 which, in the present instance, is the shaft of a small electric motor 30. This shaft 29 preferably terminates in a slotted or angular neck 31 which drives an extension shaft 32 in alignment with the shaft 29, and extending downwardly through the machine. In the present instance the angular neck 31 is received in a bushing 33 rotatably mounted in the bracket, and from this bushing or stub shaft 33 reduction gearing is driven for driving the feed screw 4 and the burr 14 at reduced speed. The extension shaft 32 may be attached to the lower end of the bushing 33 by screw threads 34 to enable this shaft to be disconnected when desired. The feed screw 4 is preferably formed on a tubular sleeve or outer shaft 35 that envelops the extension shaft 32, and this tubular shaft extends down through a guide opening 36 in the perforated plate 3 below which it may be provided with a square or angular neck 37 to fit into the hub 11 of the rotary cutter 10. Below this point the tubular shaft 35 may be provided with screw threads 38 which cooperate with the threaded hub of the burr 14. When the burr is screwed into place it holds the cutter 10 up against the small shoulder 39 formed on the tubular shaft 35 just above the squared neck 37.

The cage 6 is preferably formed with a tubular central sleeve 40 that operates as a hub for the cage, and this hub fits over the reduced lower end 41 of the inner shaft 32, and is held in place by a removable means such as a wing nut 42.

The reduction gearing may be of any suitable construction, but in the present instance, I have constructed this gearing by providing a small internal gear wheel 43 at the upper end of the tubular shaft 35, and if desired, this gear wheel may be die cast with the shaft 35. The teeth on this gear wheel mesh with an idler 44, which may be secured by means of a machine screw 45 to the under side of the bracket 21. At its inner side the teeth of this idler 44, mesh with a driving gear 46 formed at the lower end of the bushing 33. However, in practice, it may be necessary to give a considerably greater reduction in speed than that afforded by a single idler 44, in which case further reduction gearing may be provided operating to give a greater reduction in speed.

The motor 30 may be secured in place in any suitable manner; for example, by means of screws 47 that attach it to the upper side of the bracket.

As illustrated in Fig. 1, the lower end of the feed screw 4, preferably lies quite close to the upper face of the perforated plate 3, so that as the worm rotates, this part of the feed screw operates as an inclined sweep to force the chopped vegetables or fruit through the perforations of the plate.

The inner face of the body 1 is preferably provided with vertical corrugations or ribs 48, which tend to prevent rotation of the chopped fruit or vegetables, and facilitate its downward feeding movement.

The substance of the fruit and vegetables is forced through the perforations 5 of the screen or perforated plate 3, where they come in contact with the rotary cutter or chopper 10, which assists in further dividing the fruit or vegetable substance. After passing the cutter 10, the finely divided substance passes on down through the gradually narrowing throat 17, coming in contact with the upper face of the burr, which operates to crush the substance to a relatively fine pulp. By doing this, the capacity of the centrifugal cage for extracting the juices, is greatly increased.

What I claim is:

1. In a vegetable or fruit juice extractor, the combination of a casing, a perforated plate within the casing, a rotary feed device mounted to rotate on a substantially vertical axis above the perforated plate, a motor supported in axial alignment with the feed device, a shaft driven by the motor and extending coaxially through the feed device and through the said perforated plate, a centrifugal cage attached to the lower end of the shaft below the perforated plate for receiving the vegetable or fruit pulp forced through the said plate and operating to separate the juice from the pulp by centrifugal force, and reduction gearing located adjacent the motor for driving the feed device at reduced speed.

2. In a vegetable or fruit juice extractor, the combination of a casing, a perforated plate within the casing, a rotary feed device mounted to rotate on a substantially vertical axis above the perforated plate, a motor supported in axial alignment with the feed device, a shaft driven by the motor and extending coaxially through the feed device and through the said perforated plate, a centrifugal cage attached to the lower end of the shaft below the perforated plate for receiving the vegetable or fruit pulp forced through the said plate and operating to separate the juice from the pulp by centrifugal force, a burr secured adjacent the lower end of the feed device and rotating therewith, and reduction gearing located adjacent the motor for driving the feed device at reduced speed.

3. In a vegetable or fruit juice extractor, the combination of a casing, a perforated plate within the casing, a rotary feed device mounted to rotate on a substantially vertical axis above the perforated plate, a motor supported in axial alignment with the feed device, a shaft driven by the motor and extending coaxially through the feed device and through the said perforated plate, a centrifugal cage attached to the lower end of the shaft below the perforated plate for receiving the vegetable or fruit pulp forced through the said plate and operating to separate the juice from the pulp by centrifugal force, a burr secured adjacent the lower end of the feed device and cooperating with the wall of the casing to crush the pulp that has passed through the perforated plate, and rotary cutter means mounted on the under side of the perforated plate for cutting the pulp as it emerges on the lower side of the plate.

4. In a vegetable or fruit juice extractor, the combination of a casing, a perforated plate within the casing, a rotary feed screw mounted within the casing above the perforated plate for forcing the pulp of the vegetables or fruit through the perforations of the plate, a driving shaft supported in axial alignment with the feed screw and having an extension passing down coaxially with the feed screw passing through the perforated plate, rotary cutter means mounted on the under side of the perforated plate, a burr having a convex upper face mounted for rotation below the rotary cutter means, said casing above the burr having a wall converging toward the upper face of the burr at its edge and cooperating with the same to form a gradually reducing throat through which the pulp passes downwardly, a centrifugal cage mounted below the burr and receiving the crushed pulp from the same, said casing having a cup enveloping the said cage and having an orifice through which the juices may pass downwardly; and reduction gearing associated with the driving shaft for driving the feed screw and the burr at a reduced speed, said extension from the driving shaft passing down through the said burr for driving the cage at a high speed from the said driving shaft.

5. In a vegetable or fruit juice extractor, the combination of a casing, a perforated plate within the casing, a rotary feed device mounted to rotate on a substantially vertical axis above the perforated plate, a driving shaft in axial alignment with the feed device and having an extension extending downwardly through the feed device and through the said perforated plate, a centrifugal cage attached to the lower end of the extension shaft below the perforated plate for receiving vegetable or fruit pulp forced through the said plate and operating to separate the juice from the pulp by centrifugal force, a burr secured adjacent the lower end of the feed device, and reduction gearing located adjacent the driving shaft for driving the feed device and the burr at a reduced speed with respect to the speed of the cage.

6. In a vegetable or fruit juice extractor, the combination of a casing, a perforated plate within the casing, a driving shaft at the upper portion of the casing and having an extension shaft extending downwardly through the casing and through the perforated plate, a tubular shaft surrounding the extension shaft with a feed screw carried thereby, reduction gearing above the feed screw for driving the same at reduced speed with respect to the extension shaft, a centrifugal cage carried by the lower end of the extension shaft and receiving the pulp forced through the perforated plate by the feed screw.

BEN L. LORENZEN.